Nov. 28, 1933.   L. H. THULLEN   1,937,300
DRILLING APPARATUS
Filed Dec. 3, 1927   3 Sheets-Sheet 1
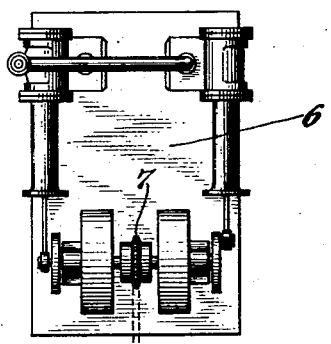
Fig. 1.
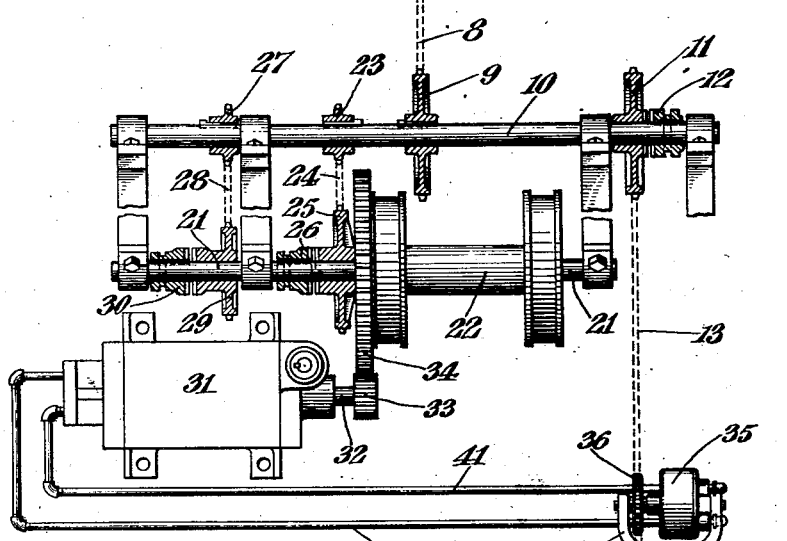
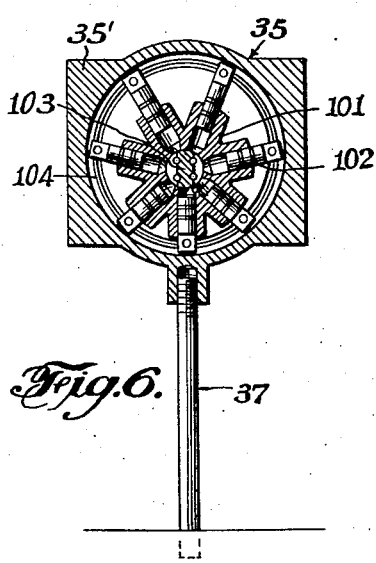
Fig. 6.
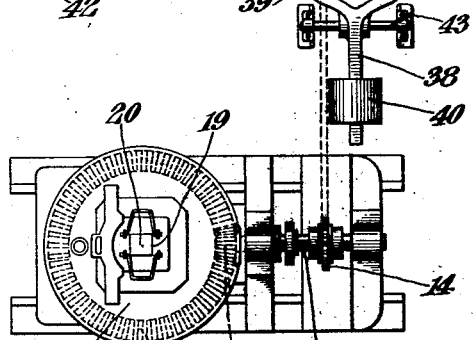
Inventor
Louis H. Thullen
By his Attorneys
Ward, Crosby & Smith

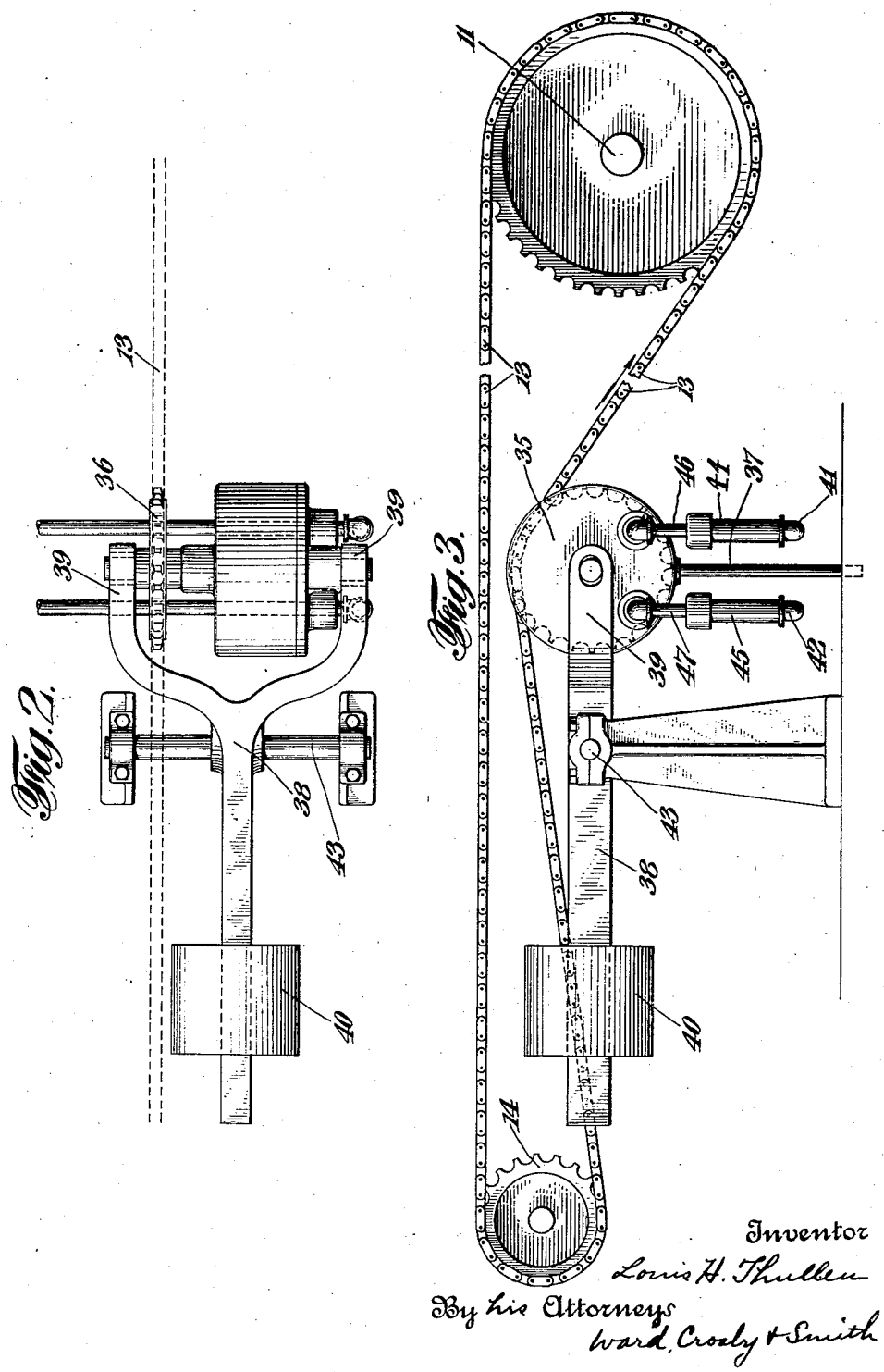

Nov. 28, 1933.  L. H. THULLEN  1,937,300
DRILLING APPARATUS
Filed Dec. 3, 1927  3 Sheets-Sheet 3
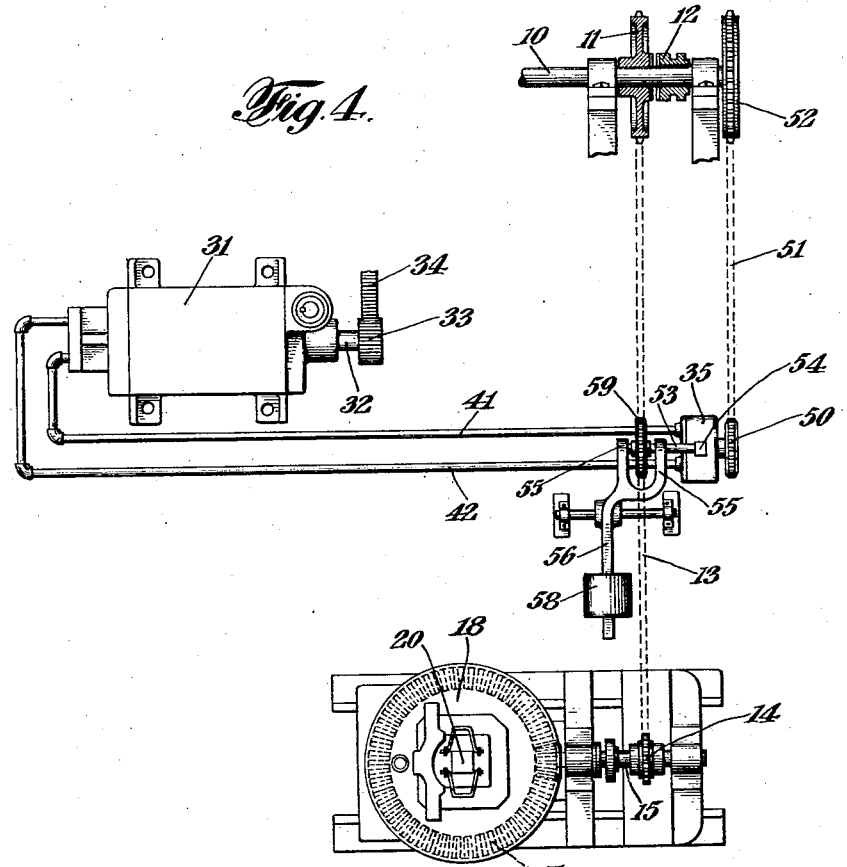
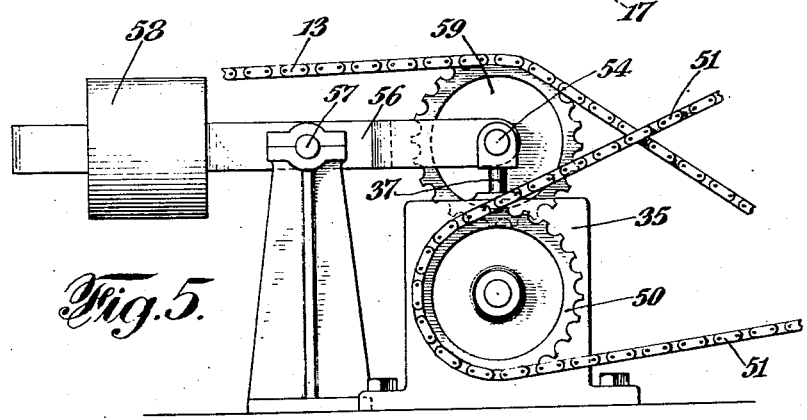
Inventor
Louis H. Thullen
By his Attorneys
Ward, Crosby & Smith Patented Nov. 28, 1933

1,937,300

UNITED STATES PATENT OFFICE 1,937,300

DRILLING APPARATUS

Louis H. Thullen, Brooklyn, N. Y.

Application December 3, 1927. Serial No. 237,433

9 Claims. (Cl. 255—19)

My invention relates to improvements in drilling apparatus and the like and are particularly adapted to apparatus for drilling oil wells or earth boring apparatus, although the invention in its broader aspects may be used in many other and entirely different types of apparatus where it is desired to control the feed of a work member with respect to its work in accordance with the load imposed upon, or resistance encountered, by the work member. The main object of the invention is to provide an arrangement in which the feeding of the drill or work member with respect to its work is automatically accomplished in a more simple and efficient manner and with a minimum amount of relatively inexpensive apparatus. Further and more specific objects, features and advantages will more clearly appear from the detail description below taken in connection with the accompanying drawings which form a part of this specification.

In the drawings, Fig. 1 is a plan view, more or less diagrammatic, illustrating certain portions of an apparatus embodying my improvements in one form. Fig. 2 is a plan view on an enlarged scale showing the pump and connecting parts illustrated in Fig. 1. Fig. 3 is a side view of parts shown in Fig. 2. Fig. 4 is a view similar to Fig. 1, but illustrating a modification. Fig. 5 is a side view of the pump and connecting parts illustrated in Fig. 4. Fig. 6 is a sectional view of the pump shown in Fig. 3.

Referring to Figs. 1, 2 and 3, 6 represents a suitable steam engine or other prime mover driving a sprocket wheel 7 cooperating with a sprocket chain 8 driving a sprocket 9 keyed to the shaft 10. On one end of the shaft 10 is a sprocket 11 adapted to be connected to rotate with the shaft 10 by a clutch 12. The sprocket 11 may thus drive an endless driver consisting of a sprocket chain 13 which drives a sprocket 14 on a shaft 15, which has secured thereto a bevelled gear 16 meshing with a bevelled gear 17 on the underneath side of a rotary table member 18. The rotary table member 18 is so constructed as to provide a square aperture or hole 19 therein through which extends one section 20 of a rotary drilling member, said section being square in cross-section so as to substantially fit the square hole 19, whereby rotation of the table 18 rotates the drilling member. Connected to the section 20 in any well known or suitable manner are other sections of the drilling member which extend into the hole or well being drilled in the ground when the apparatus is used, for example, for drilling oil wells.

21 represents another shaft and secured to and rotated by the shaft 21 is a drum 22 on which is adapted to be wound a rope or cable for raising and lowering the drilling member and feeding the same with respect to its work in any well known or suitable manner, as will be readily understood by those skilled in the art. The shaft 21 may be rotated at one speed by means of a sprocket 23 keyed to shaft 10, operating the sprocket chain 24 passing over a sprocket 25 loose on the shaft 21, but adapted to be connected to rotate the shaft by a clutch member 26. If it is desired to rotate the drum 22 from the shaft 10 at greater speed, this may be accomplished by sprocket 27 keyed on shaft 10, operating sprocket chain 28 passing over a sprocket 29 loosely mounted on the shaft 21 but adapted to be connected to rotate the shaft 21 by a clutch member 30.

In order to provide automatic means for regulating the feed of the drill or work member with respect to its work, I provide a fluid motor, 31, preferably of the hydraulic type, and one which will exercise a varying torque in accordance with the rate of flow or pressure of the fluid supplied to operate the same. Such fluid motors are well known and therefore need not be further described. The motor 31 rotates the shaft 32 having secured thereto a gear 33 meshing with a gear 34 fixed on the shaft 21 so that operation of the motor 31 causes rotation of the drum 22 which controls the feed of the drill with respect to its work.

35 represents a fluid pump preferably a hydraulic pump having a rotatable element driven by a shaft on which is secured a sprocket 36 for driving the same. The stroke of the pump and hence the rate at which it will pump the fluid is varied and regulated by relative movement between two elements of the pump, one of which is connected to the rod 37 (Fig. 3) which is shown as extending upward from the floor or fixed support.

The pump is of the same general type as the well-known Hele-Shaw variable stroke hydraulic pump, and may be essentially the same as is illustrated in Fig. 5 of my co-pending application Ser. No. 151,305, filed Nov. 29, 1926, for Drilling apparatus and the like, with the rod 37 above mentioned being substituted for the screw-threaded rod 64 described in said application Ser. No. 151,305. This pump 35 is illustrated in Fig. 6.

The pump, as described in my said application, comprises a cylinder body 101 carrying a number of radial cylinders in which operate plungers 102, these cylinders being concentric with a central cylindrical valve 103 containing parallel ports through which the fluid passes to and from the pump, this valve not rotating. The plungers 102 are connected at their outer ends to a floating outer ring 104 mounted in a frame 35'.

The variation of the stroke and action of the pump is effected by causing relative movement between ring 104 and the cylinder body 101 carrying the radial cylinders. This relative movement can be effected by holding ring 104 and moving the cylinder body 101 relative thereto, or by holding cylinder body 101 and moving ring 104 relative thereto. When the cylinder body 101 and ring 104 are concentric with each other, rotation of the cylinder body will cause no discharge of fluid from the pump, but discharge will be effected at varying rates as the cylinder body is moved relatively to ring 104 to varying positions of eccentricity thereto. Also the direction of discharge from the pump will be in one direction or the other in accordance with whether the eccentricity of the cylinder body with respect to the ring 104 is in one direction or the other. All of the above is well known.

In the form of construction illustrated in Figs. 1, 2, 3 and 6, the floating ring 104 is held by connection of fixed rod 37 with the frame 35' in which ring 104 is mounted, and the rotatable cylinder body 101 is movable relatively thereto. The shaft on which sprocket 36 is secured is concentric with and integral or secured to cylinder body 101, so that movement of sprocket chain 13 continually rotates cylinder body 101 in the same direction. The rotatable member 101 of the pump is supported by a lever 38 pivoted at 43 and having arms 39 in which the shaft of the pump is journalled and supported. At its opposite end the lever 38 is provided with a counter-weight 40 which is adapted to considerably over-balance the weight of the pump. The underneath or pulling side of the endless sprocket chain 13 passes over the sprocket wheel 36 so as to drive the sprocket and rotate the rotatable member of the pump.

With the pump 35 raised to its highest position by the weight 40, the pump 35 forces the fluid, such as water or oil, out through the pipe 41 and into the motor 31, thereby causing the motor 31 to tend to turn the shaft 32 and drum 22 in a direction to lower the drilling tool to its work. The exhaust fluid from the motor 31 is returned to the pump 35 by the pipe 42. As the drilling member engages its work, it encounters more or less resistance, thereby putting the lower stretch of the endless sprocket chain 13 under greater tension and when the desired maximum torque is being exercising by the drilling member, the increased tension on the lower stretch of the endless drive chain 13 will cause it to force the pump 35 down in opposition to the counterweight 40 until cylinder body 101 and ring 104 become concentric so that the stroke of the pump is reduced to zero so that it no longer pumps fluid to the motor 31 and the motor 31 stops its feed of the drilling member and holds the drum 22 stationary. In order to accommodate the up and down movement of the pump 35, the pipes 41 and 42 are connected to the pump 35 through pipe connections comprising stuffing boxes 44 and 45 in which the pipe connections 46 and 47 slide respectively (see Fig. 3). Should the work offer excessive resistance to the drilling tool or the load encountered by work member be greater than desired the increased tension thereby excited on the lower stretch of the endless chain 13 will cause it to lower the pump 35 still further and so cause the rod 37 to be still further pushed into the pump, that is, cause the center of body 101 to pass over the center of ring 104, thereby causing the pump to operate in the reverse direction and pump the fluid through the pipe 42 into the motor 31 to cause the motor 31 to operate the drum 22 so as to lift or withdraw the drilling member from its work and thus decrease the load thereon so as to prevent injury to the drilling member or other portions of the apparatus. Thus the feed of the drilling member with respect to its work is automatically regulated so that it will always operate at maximum efficiency and yet any excessive load or resistance encountered by the work member is prevented from injuring the apparatus. The weight 40 is adjustable on the lever 38 so that it may be set to limit the torque on the work member to any desired maximum.

In the modification shown in Figs. 4 and 5 the parts are substantially the same except that the pump 35 is stationary and is driven by a sprocket 50 which in turn is driven by a sprocket chain 51 driven by a sprocket 52 secured to the shaft 10. The control rod 37 is connected to the frame member 35' which carries floating ring 104 the same as in the form of the invention previously described. In the form shown in Figs. 4 and 5 relative motion for adjustment of the stroke is obtained by moving ring 104 relatively to the cylinder body 101. This is accomplished by moving the control rod 37 in accordance with variations in the tension of the sprocket chain 13. In the construction illustrated a shaft 53 is pivotally attached to the upper end of the rod 37 at 54. The shaft 53 is journaled in slots in the arms 55 forming a fork at one end of a lever 56 pivoted at 57 and having a counterweight 58 at its opposite end. Journaled on the shaft 53 between the arms 55 is an idler sprocket 59 over which runs the lower stretch of the endless chain 13. As the tension thereon increases to the desired maximum due to the resistance encountered by the work member, it will force sprocket 59, arms 55 and rod 37 downwardly in opposition to the counterweight 58 to control and regulate the pump 35 in the same manner as described in connection with Figs. 1, 2 and 3.

Instead of the hydraulic pump 35 any other suitable fluid pump may be used and any arrangement may be used for controlling the effect of the pump on the fluid motor. Thus a suitable valve operated responsive to the resistance encountered by the work member and controlling the flow of fluid to the motor, might be used.

While I have described my improvements in detail and with respect to preferred forms thereof, I do not desire to be limited to such details or forms since many changes and modifications may be made and the improvements embodied in widely different forms without departing from the spirit and scope of the invention in its broader aspects. Hence I desire to cover all modifications and embodiments coming within the language or scope of any one or more of the appended claims.

What I claim as new and desire to secure by Letters Patent, is:

1. The combination of a work member, means for driving the work member a fluid motor for regulating the feed of the work member with respect to its work independent of the speed of the work member, a variable stroke fluid pump for pumping fluid to the fluid motor to operate the motor and means regulating the stroke of the pump, and thereby the action of the pump on the motor responsive to variations in resistance encountered by the work member.

2. The combination of a rotary drilling member, means including an endless deflectable flexible driver for driving the same, a rotatable feeding means for feeding said drilling member with respect to its work, means including a fluid motor for varying the speed of rotation of said rotatable feeding means and the feed of the drilling member with respect to its work, a variable delivery fluid pump for pumping fluid to the motor and means controlled by the deflections in said flexible driver for varying the delivery of the pump responsive to variations in resistance encountered by the drilling member.

3. The combination of a work member, means including an endless deflectable flexible driver for driving the work member, means including a variable torque fluid motor for regulating the feed of the work member with respect to its work, and means controlled by variations in deflection in said endless driver for regulating the fluid delivered to said motor and the torque produced thereby.

4. The combination of a work member, means including a deflectable flexible endless driver for driving the work member, means including a fluid motor for regulating the feed of the work member with respect to its work, a variable delivery pump for pumping fluid to the motor, and means acting responsive to variations in deflections in said endless driver for varying the action of said pump.

5. The combination of a rotary drilling member, means including an endless deflectable driver for rotating the drilling member, a fluid motor for raising and lowering the drilling member with respect to its work, a variable delivery fluid pump for pumping fluid to the motor to operate the same, and means for varying the rate of fluid output from said pump and to the motor responsive to variations in the deflections in said endless driver.

6. The combination of a work member, means including a variable stroke, variable delivery fluid pumping device for varying the feed of the work member with respect to its work independent of the speed of the work member, said device having elements which are relatively adjustable for varying the stroke of said pumping device, and means responsive to variations in resistance encountered by the work member and operable independently of the speed of the work member for causing relative motion between said elements, to vary the stroke of the pumping device.

7. The combination of a work member, means including a flexible endless driver for driving the work member, a reversible, variable-torque motor for regulating the feed of the work member with respect to its work, and coacting means, comprising a member continuously yieldingly pressed against a portion of said driver and a member relatively moveable thereto, said members being arranged to vary the action of said motor in accordance with the relative motion between them, said relative motion being responsive to variations in the tension on said endless driver.

8. The combination of a work member, means including a deflecting endless driver for driving the work member, means including a fluid motor for regulating the feed of the work member with respect to its work, a pump for pumping fluid to the motor, and means responsive to the variation in deflection of said endless driver for varying the action of said pump.

9. The combination of a work member, means including a flexible band for driving the work member, means including a fluid motor for regulating the feed of the work member with respect to its work, a pump for pumping fluid to the motor, and means responsive to deflections in said flexible band for varying the action of said pump.

LOUIS H. THULLEN.